US009770839B1

(12) United States Patent
Tropper et al.

(10) Patent No.: US 9,770,839 B1
(45) Date of Patent: Sep. 26, 2017

(54) TOTE BOX SEAL CUTTING STATION

(71) Applicant: Cambridge Security Seals LLC, Pomona, NY (US)

(72) Inventors: Elisha Tropper, Scarsdale, NY (US); Gurmeet Grover, Oakland, NJ (US); Samuel Harman, Pomona, NY (US); Micheal Gizzarlli, Newburgh, NY (US)

(73) Assignee: Cambridge Security Seals, LLC, Pomona, NY (US)

( * ) Notice: Subject to any disclaimer, the term of this patent is extended or adjusted under 35 U.S.C. 154(b) by 262 days.

(21) Appl. No.: 14/665,561

(22) Filed: Mar. 23, 2015

Related U.S. Application Data

(60) Provisional application No. 61/970,408, filed on Mar. 26, 2014.

(51) Int. Cl.
  *B26D 1/09* (2006.01)
  *B26D 5/08* (2006.01)
  *B65D 55/10* (2006.01)
  *B29C 45/38* (2006.01)

(52) U.S. Cl.
  CPC ............ *B26D 5/08* (2013.01); *B26D 1/09* (2013.01); *B29C 45/38* (2013.01); *B65D 55/10* (2013.01)

(58) Field of Classification Search
  CPC .......... B26D 1/095; B26D 1/09; B29C 45/38; B29C 45/382; B29C 2045/384; B29C 2045/386; B29C 2045/388
  USPC .............................. 83/614, 914; 269/53–54.5
  See application file for complete search history.

(56) References Cited

U.S. PATENT DOCUMENTS

| | | | | |
|---|---|---|---|---|
| 2,409,203 A * | 10/1946 | Gale | ...................... | B26D 1/045 411/937.2 |
| 3,450,001 A * | 6/1969 | Fortune | .................. | B23Q 3/066 144/136.95 |
| 3,540,639 A * | 11/1970 | Carlson | ................. | B29C 45/382 225/100 |
| 4,585,152 A * | 4/1986 | Sager | ..................... | B26D 7/086 225/1 |
| 4,738,177 A * | 4/1988 | Jones, III | .............. | B26D 1/115 83/455 |
| 5,244,606 A * | 9/1993 | Maus | .................. | B29C 45/1771 264/1.33 |
| 5,556,649 A * | 9/1996 | Sumioka | .................. | B25D 9/14 173/114 |
| 5,596,915 A * | 1/1997 | Spencer | ................ | B29C 45/382 83/171 |
| 6,178,860 B1 * | 1/2001 | Peters | .................. | B23D 35/008 83/461 |

(Continued)

OTHER PUBLICATIONS

U.S. Appl. No. 14/851,202, filed Sep. 11, 2015 (Grover, Gizzarelli and Tropper) claiming priority to U.S. Appl. No. 62/050,841, filed Sep. 16, 2014.

(Continued)

*Primary Examiner* — Kenneth E Peterson
(74) *Attorney, Agent, or Firm* — Malina & Associates, PLLC

(57) ABSTRACT

A cutting station includes a plurality of actuator driven cutting blades for separating seals which have been formed as a mat of connected individual seals. The cutting station also includes a plurality of actuator driven pins which bear against and break away a runner portion of the mat thus freeing the individual seals.

12 Claims, 18 Drawing Sheets

(56) References Cited

U.S. PATENT DOCUMENTS 6,308,604 B2 * 10/2001 Guzowski ................ B26D 1/04
                                                    83/257
6,773,250 B2 *  8/2004 Wilsterman ............ B29C 45/42
                                                    264/161

OTHER PUBLICATIONS

U.S. Appl. No. 14/590,272, filed Jan. 6, 2015 (Tropper et al) claiming priority to U.S. Appl. No. 61/924,455, filed Jan. 7, 2014.

* cited by examiner

TOTE BOX SEAL CUTTING STATION

The present application claims priority from my Provisional Patent Application, titled Tote Box Cutting Seal Station, Ser. No. 61/970,408, filed on Mar. 26, 2014.

FIELD OF THE INVENTION

The present invention relates generally to the field of equipment for the manufacture of seals and more particularly to a tote box seal cutting station.

BACKGROUND OF THE INVENTION

The manufacture of tote box seals typically involves the simultaneous molding of a plurality of individual tote box seals thus forming a single unit which is usually called a mat. The individual tote box seals in the mat as molded are joined at their tips by a runner or strip of plastic which is formed by a portion of the mold which distributes the plastic raw material to individual mold cavities to form the individual tote box seals. The runners must be removed prior to packaging the seals for use. In addition to being joined at their tips by the runner, adjacent individual tote box seals are joined together by thin portions of plastic material.

The simultaneous molding of a plurality of tote box seals as a single unit or mat provides an economy of manufacture as the simultaneous manufacture of a plurality of tote box seals reduces the total number of molding cycles required. However, this economy of manufacture results in a need to separate the tote box seals into either single or individual tote box seals or groups of two seals or another desired grouping of seals prior to packaging for use. There is a requirement for accuracy in the separation process since in selected applications the tote box seals must be used as pairs, for example to seal opposite ends of a tote box and as a result the pairs of tote box seals must carry specific individual identification indicia. During, use individual seals from different pairs cannot be mixed.

In the packaging of tote box seals it is desirable for the seals to be packaged in a flat and orderly stack rather than a tangled and random pile. As a result, there is a need to provide a way to cut the mat of tote box seals apart, remove the connecting runner and stack the cut seals in a container to form an orderly stack. At the present time these requirements cannot be met by available equipment which can perform this task in an efficient and reliable manner.

OBJECTS AND SUMMARY OF THE INVENTION

It is an object of the present invention to overcome the disadvantages of the prior art by providing a tote box seal which can cut tote box seals apart after molding.

Another object of the present invention is to provide a tote box seal cutting station which can operate at relatively high speed.

Yet another object of the present invention is to provide a tote box seal which is capable of reliable long term operation with a minimum amount of maintenance.

Other objects and advantages of the present invention will be made clear hereinafter.

The present invention overcomes the disadvantages of the prior art by providing a tote box seal cutting station which is capable of cutting tote box seals into desired groups of individual tote box seals, pairs of tote box seals or other desired groupings of tote box seals. The tote box seal cutting station is also capable of removing a common runner which is formed during the molding process and which joins individual tote box seals together. The tote box seal cutting station maintains the tote box seals a in a flat condition allowing them to be stacked in a container in a flat and orderly stack.

The tote box seal cutting station includes a base plate, a pin assembly and a cutter assembly. The cutter assembly includes a plurality of cartridges, each of which support a cutting blade. The cartridges are driven by a first pneumatic actuator to cut a mat of tote box seals apart while maintaining the tote box seals in a flat configuration. The spacing between the cutting blades is controlled by a user by inserting a cutting blade in each of the plurality of cartridges or alternatively, inserting a cutting blade in a selected number of cartridges. The pin assembly includes a plurality of pins which are driven by second pneumatic actuator. The pneumatic actuator drives the pins to bear against and remove a runner portion which is formed during the molding of the mat of tote box seals.

BRIEF DESCRIPTION OF THE DRAWINGS

Additional details of construction of the present invention will be described with reference to the drawings in which.

DETAILED DESCRIPTION OF THE INVENTION

Figure 3:
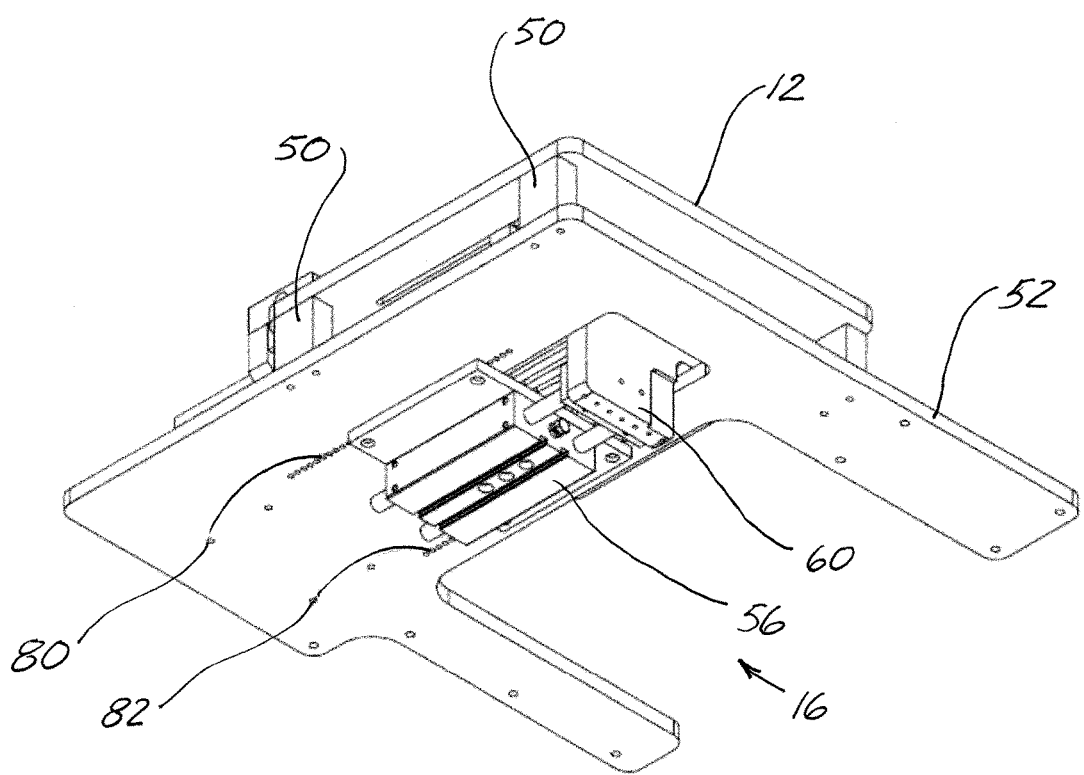
FIG. 3 an overall bottom perspective view of the tote box seal cutting station of FIG. 2.
Figure 4:
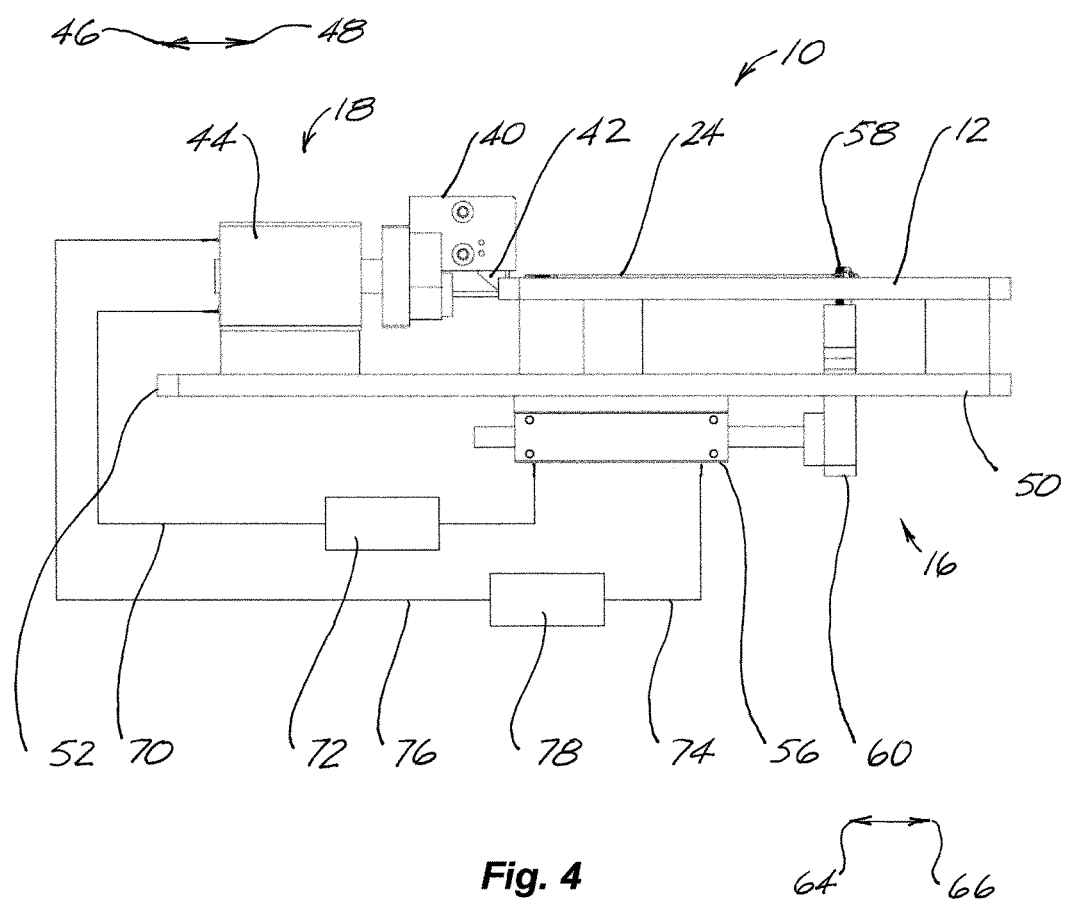
FIG. 4 is a side elevation view of the tote box seal cutting station of FIG. 2 which is partially schematic, showing a mat of tote box seals in place on the base plate.
Figure 5:
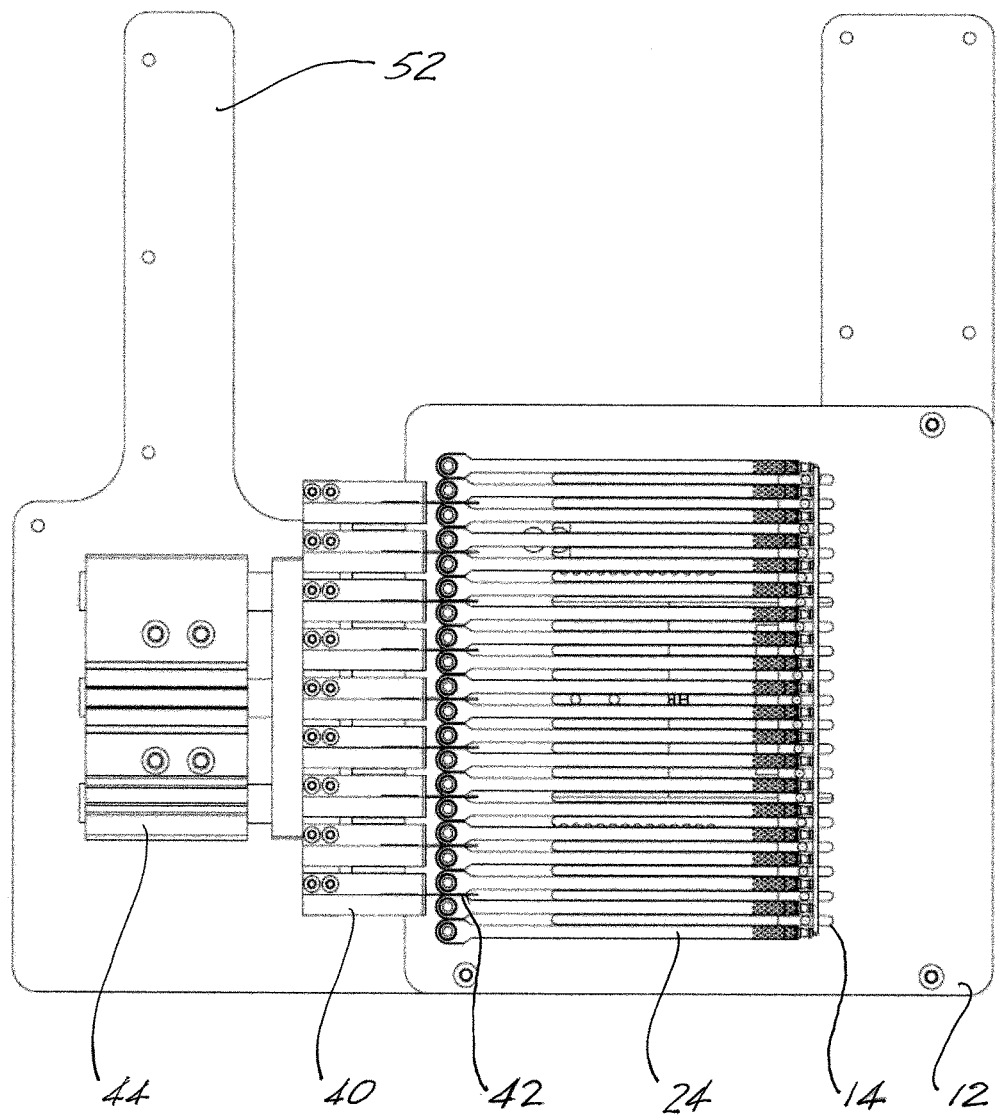
FIG. 5 is a top plan view of the tote box seal cutting station of FIG. 2 taken along the line 5-5 of FIG. 2.
Figure 6:
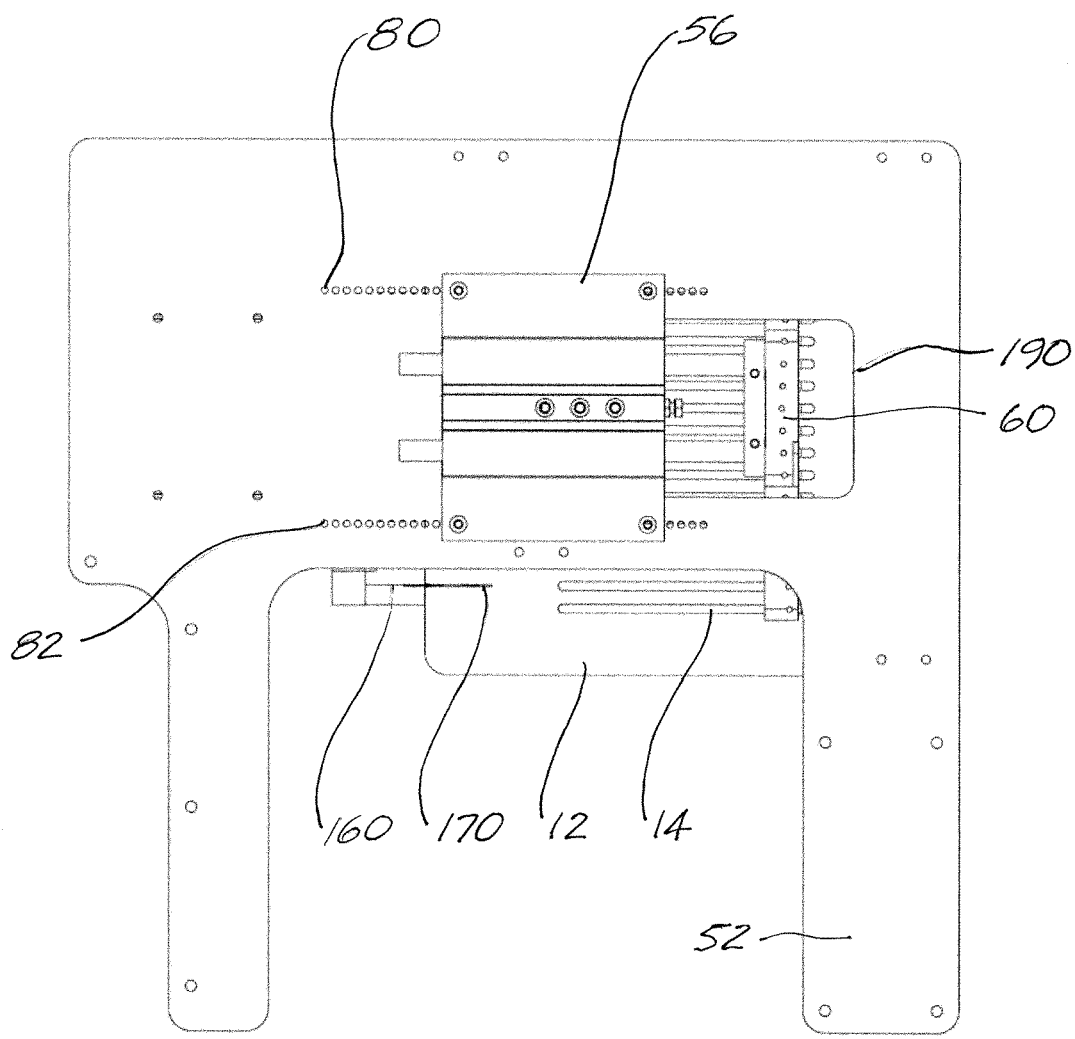
FIG. 6 is a bottom plan view of the tote box seal cutting station of FIG. 2 taken along the line 6-6 of FIG. 2.

With reference to the drawings, there is shown in FIGS. 1-13 a tote box seal cutting station 10 made in accordance with the present invention. The tote box seal cutting station 10 includes a base plate 12 having a plurality of slots which are indicated typically by the reference numeral 14, a pin assembly 16 disposed below the base plate 12. The pin assembly 16 is best shown in FIGS. 3 and 4. A cutter assembly 18 is disposed above the base plate 12. The base plate 12 also includes a plurality of holes or cavities which are indicated typically by the reference numeral 20 and which, during use, receive the locking barrels 22 of a mat of tote box seals 24, which is best shown in FIGS. 14-17. The cutter assembly 18 is best shown in FIGS. 4 and 13.

The mat of tote box seals 24, as molded, is shown in FIGS. 14-17. The mat of tote box seals 24 is not part of the structure of the present invention but rather the work piece on which the tote box seal cutting station 10 operates.

As is shown in FIGS. 14-17 the mat of tote box seals 24, as molded, comprises a plurality of tote box seals with adjacent tote box seals, for example tote box seals 132, 134, connected one to another by a relatively thin portion 206 and with the tips 34 of each of the plurality of tote box seals connected to a runner 36. The individual tote box seals are identified for reference purposes by numerals 100, 102, 104, 106, 108, 110, 112, 114, 116, 118, 120, 122, 124, 126, 128, 130, 123, 134, 136, 138.

Figure 7:
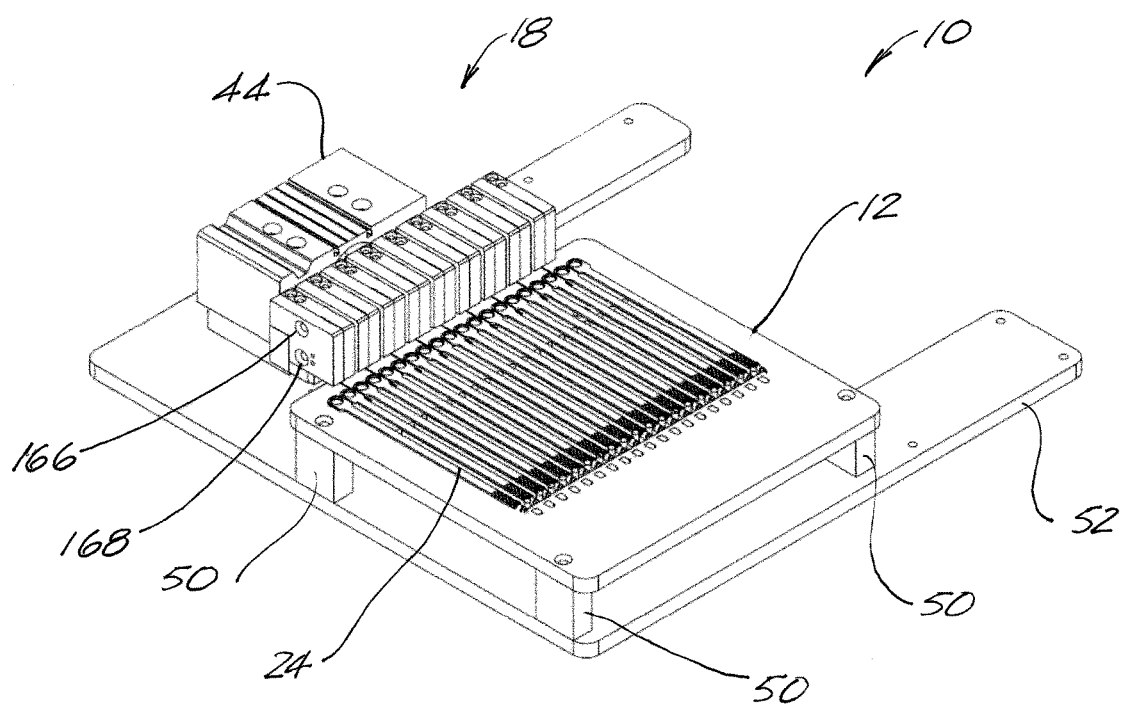
FIG. 7 is a perspective view of the tote box seal cutting station similar to FIG. 2 showing a mat of tote box seals in place on the base plate prior to operation of the tote box seal cutting station.

FIG. 7 shows the mat of tote box seals 24 in place on the base plate 12 of the tote box seal cutting station 10 prior to the operation of the tote box seal cutting station 10.

The tote box seal cutting station 10, according to the present invention is typically disposed down stream from a molding station, which is not illustrated, in which the mat of tote box seals 24 is formed and a marking station 200 in which the various indicia are formed on the individual tote box seals 100, 102, 104, 106, 108, 110, 112, 114, 116, 118, 120, 122, 124, 126, 128, 130, 123, 134, 136, 138. For clarity of illustration, the marking station 200 has not been illustrated in detail.

Figure 2:
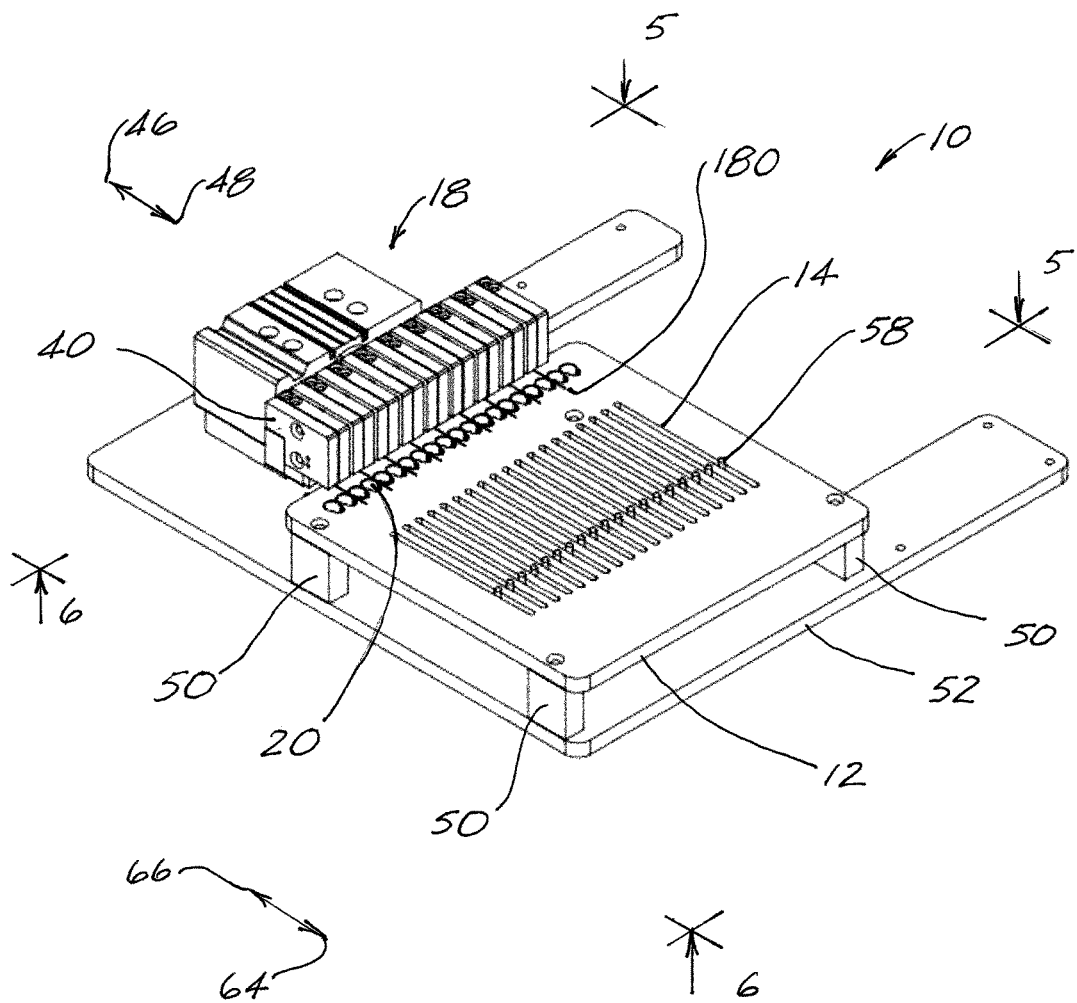
FIG. 2 is an overall top perspective view of the tote box seal cutting station of FIG. 1 with the tote seal cutting station shown removed from the molding machine transfer station.
Figure 14:
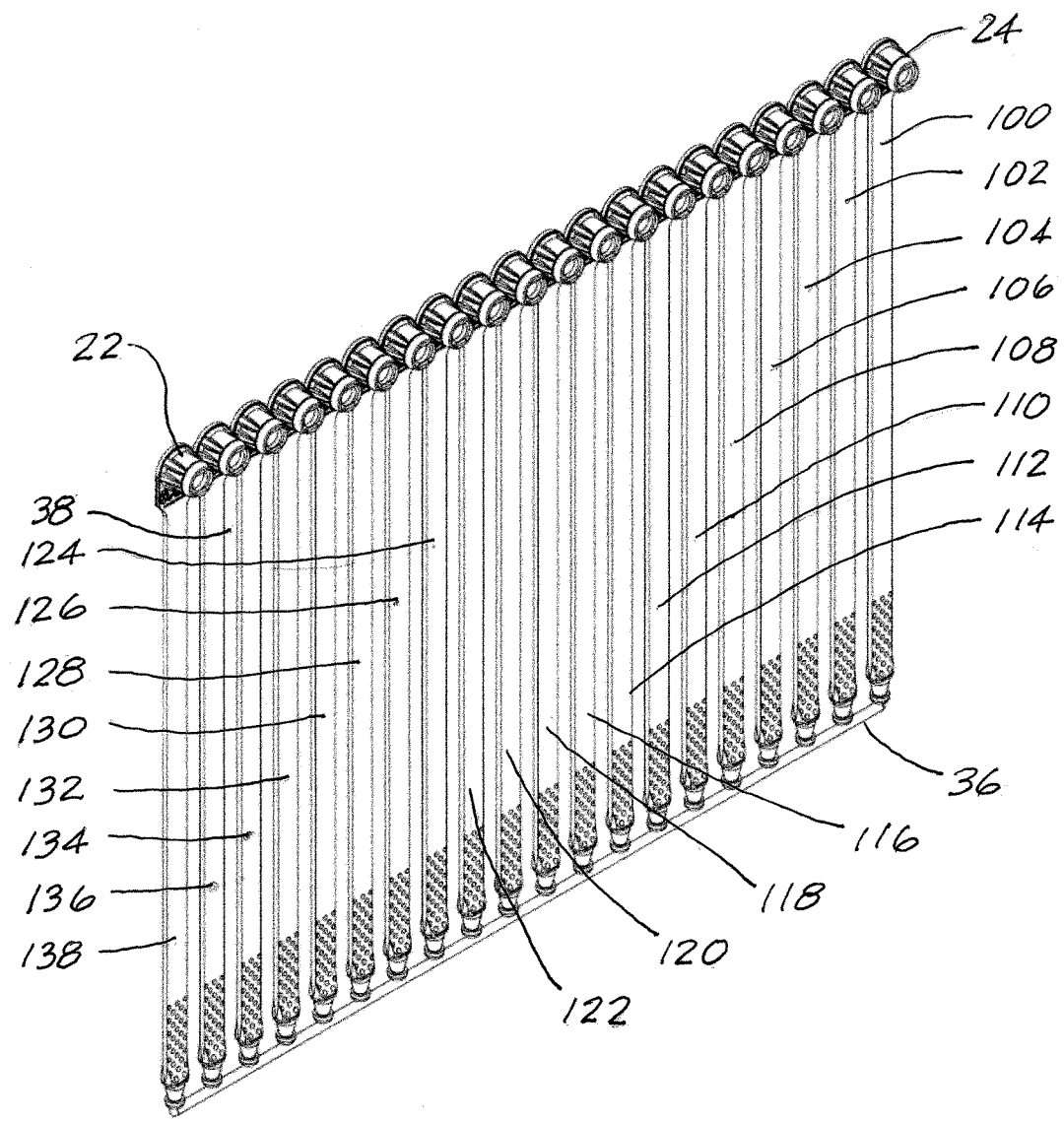
FIG. 14 is a front perspective view of a mat of tote box seals, as molded, showing a plurality of tote box seals with adjacent tote box seals connected one to another and showing all of the tote box seals connected to a runner.

As is shown in FIG. 2, the base plate 12 includes the plurality of slots 14 which corresponds to the number of spaces or apertures identified typically by the reference numeral 38 between adjacent tote box seals 134, 136 as is shown in FIG. 14. The plurality of cavities 20 corresponds in number with the number of individual tote box seals 100, 102, 104, 106, 108, 110, 112, 114, 116, 118, 120, 122, 124, 126, 128, 130, 123, 134, 136, 138 in the mat 24 as shown in FIG. 14. The cavities 20 are proportioned to accept the locking barrels 22 of the tote box seals when the mat 24 is placed on the base plate 12 as is shown in FIG. 7.

The cutter assembly 18 includes a plurality of cartridges 40, each of which supports a blade 42, as is best shown in FIGS. 4, 5, 7, 8, 9, 11 and 12. As shown in FIG. 4, cartridges 40 are connected to a first actuator 44 which can move the cartridges 40 in the directions shown by the arrows 46, 48 in FIG. 4, generally parallel to the base plate 12.

Alternatively, a cutting blade 42 may be inserted in only a selected number of cartridges of the plurality of cartridges 42 and, as a result, only selected tote box seals are cut apart leaving a desired number of tote box seals uncut.

Figure 1:
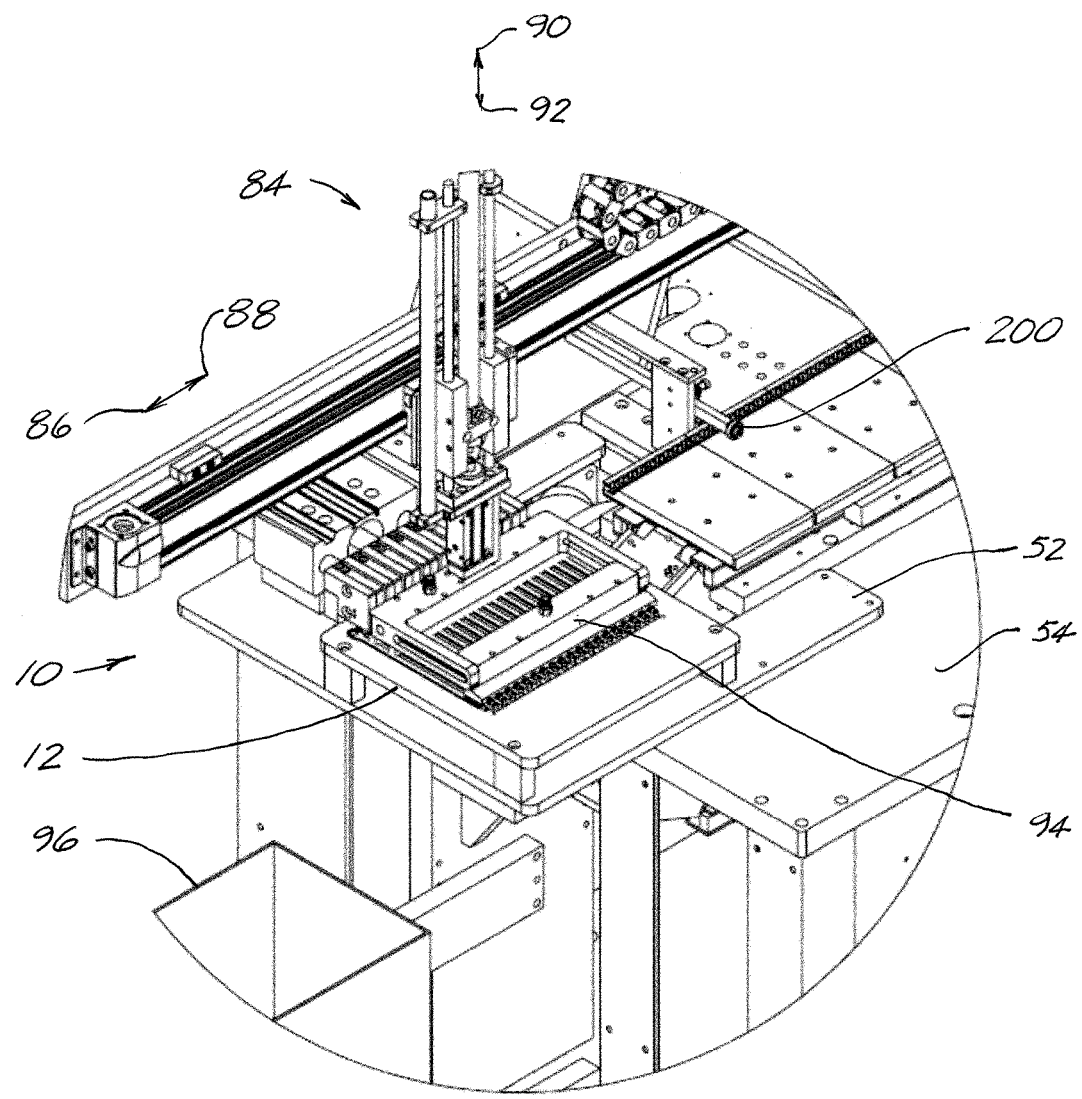
FIG. 1 is an overall perspective view of a tote box seal cutting station, made in accordance with the present invention, with the tote seal cutting station shown in use installed in a molding machine transfer station.

As shown in FIG. 7, the base plate 12 is supported by a plurality of support blocks 50 which are mounted on a support plate 52. The support plate 52 is mounted on a support table 54 as is shown in FIG. 1.

The pin assembly 16 includes a second actuator 56 which is mounted on the support plate 52 as is best shown in FIG. 4. The pin assembly 16 also includes a plurality of pins 58.

The plurality of pins 58 ride, one each, in the slots 14 and the pins 58 are connected to a connector bar 60 as is best shown in FIG. 4. The connector bar 60 is connected to the second actuator 56 which can move the connector bar 60 and all of the pins 58 in the directions shown by the arrows 64, 66 in FIGS. 2 and 4, generally parallel to the base plate 12. The connector bar 60 projects through an aperture 190 formed in the support plate 52 as is best shown in FIG. 3.

As indicated schematically in FIG. 4, the first actuator 44 and the second actuator 56 are connected via electrical cables 68, 70 to a control system 72 which includes a programmable logic controller and which provides timing and control functions. The first and second actuators 44, 56 are also connected via air lines 74, 76 to a high pressure air source 78.

In the preferred embodiment the actuators 44, 56 are pneumatic actuators.

As is shown in FIG. 3, the support plate 52 includes an array of mounting holes 80, 82 which facilitate the mounting of the second actuator 56 in different positions along the support plate 52. The mounting holes 80 and the slots 14 enables the tote box seal cutting station 10 to be used on mats of tote box seals 24 of different lengths.

During operation, the transfer assembly 84, shown in FIG. 1, which is capable of both horizontal motion in the directions shown by the arrows 86, 88 and vertical motion in the directions shown by the arrows 90, 92 and which includes a vacuum bar 94, moves a mat of tote box seals 24 from the marking station 200 and places the mat of tote box seals 24 on the base plate 12. The pins 58 enter the spaces formed between adjacent tote box seals in the mat 24, for example, the space 38 formed by the adjacent tote box seals 132, 134 shown in FIG. 14.

The cutter assembly 18 can be adjusted by providing a full complement of blades 42 or less than a full complement of blades 42 in the cartridges 40 to cut the mat of tote box seals 24 apart to form individual tote box seals 100, 102, 104, 106, 108, 110, 112, 114, 116, 118, 120, 122, 124, 126, 128, 130, 123, 134, 136, 138 or to form pairs of tote box seals or other desired groups of tote box seals.

During operation under the control of the control system 72 and the high pressure air source 78, the cutter assembly 18 moves in the directions shown by the arrow 46, 48 in FIGS. 2 and 4 and the pins 58 move in the directions shown by the arrow 64, 66 in FIG. 4. The blades 42 cut the tote box seals 24 apart along the relatively thin portions 206. The pins 58 bear against the runner 36 and break the runner away from the tips 34 of the tote box seals 24.

Figure 15:
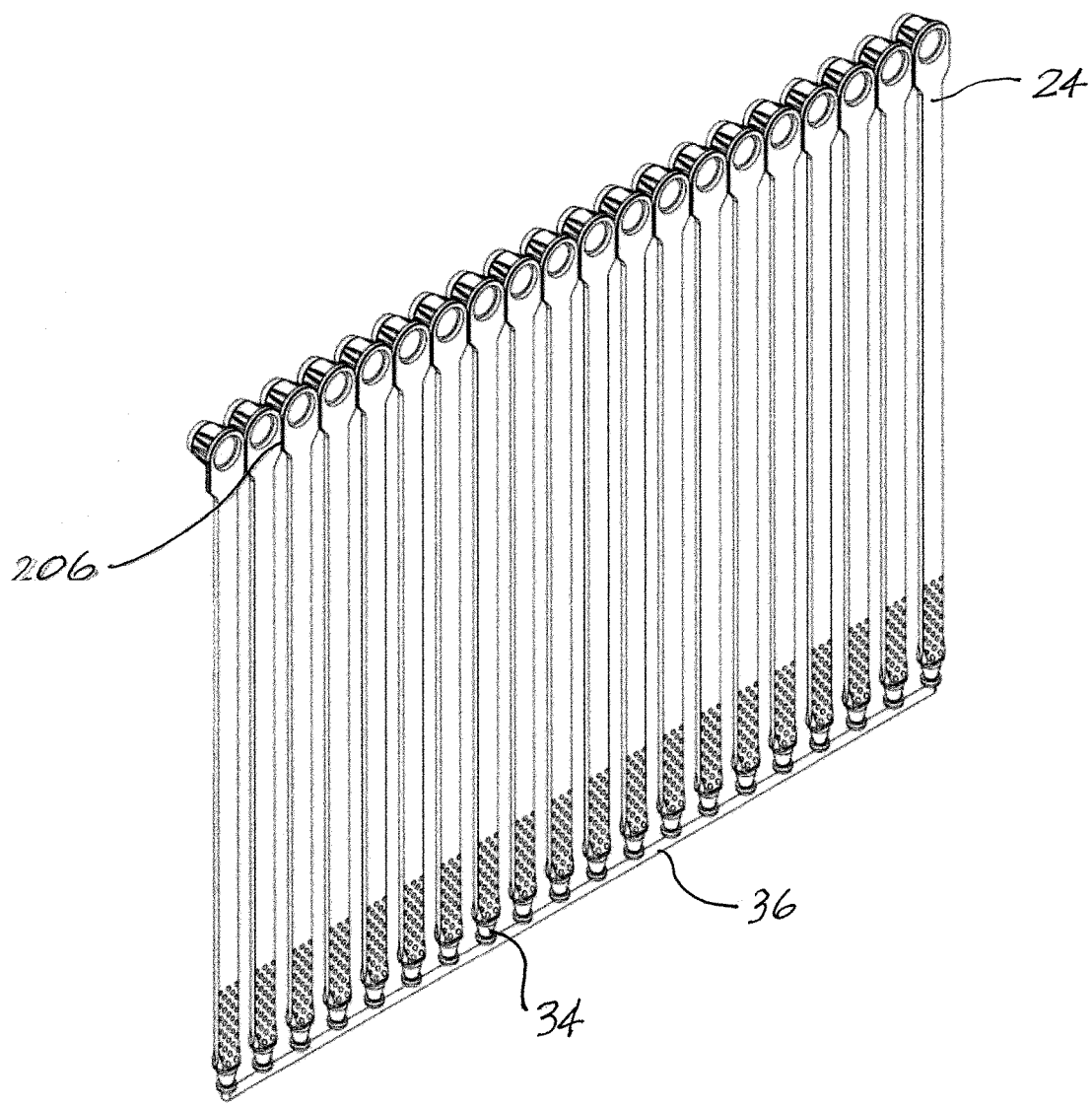
FIG. 15 is a rear perspective view of the mat of tote box seals of FIG. 14.
Figure 16:
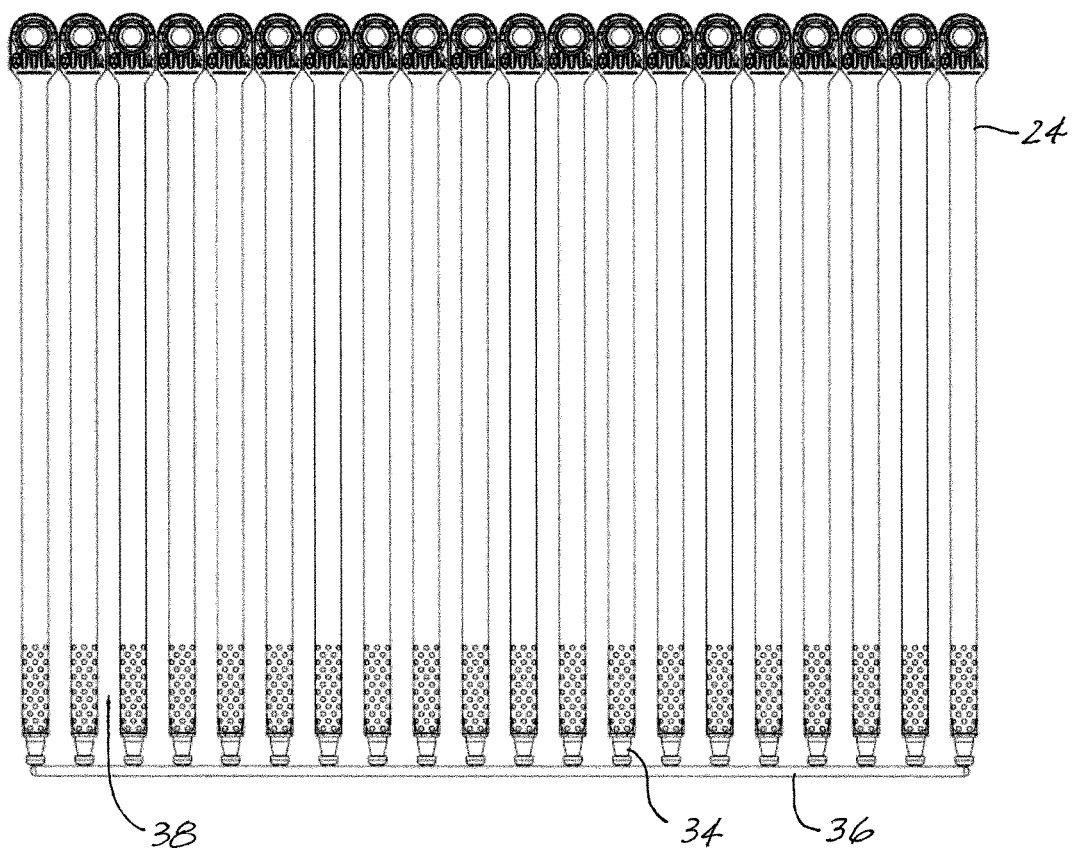
FIG. 16 is a top plan view of the tote box seals of FIG. 14.
Figure 17:
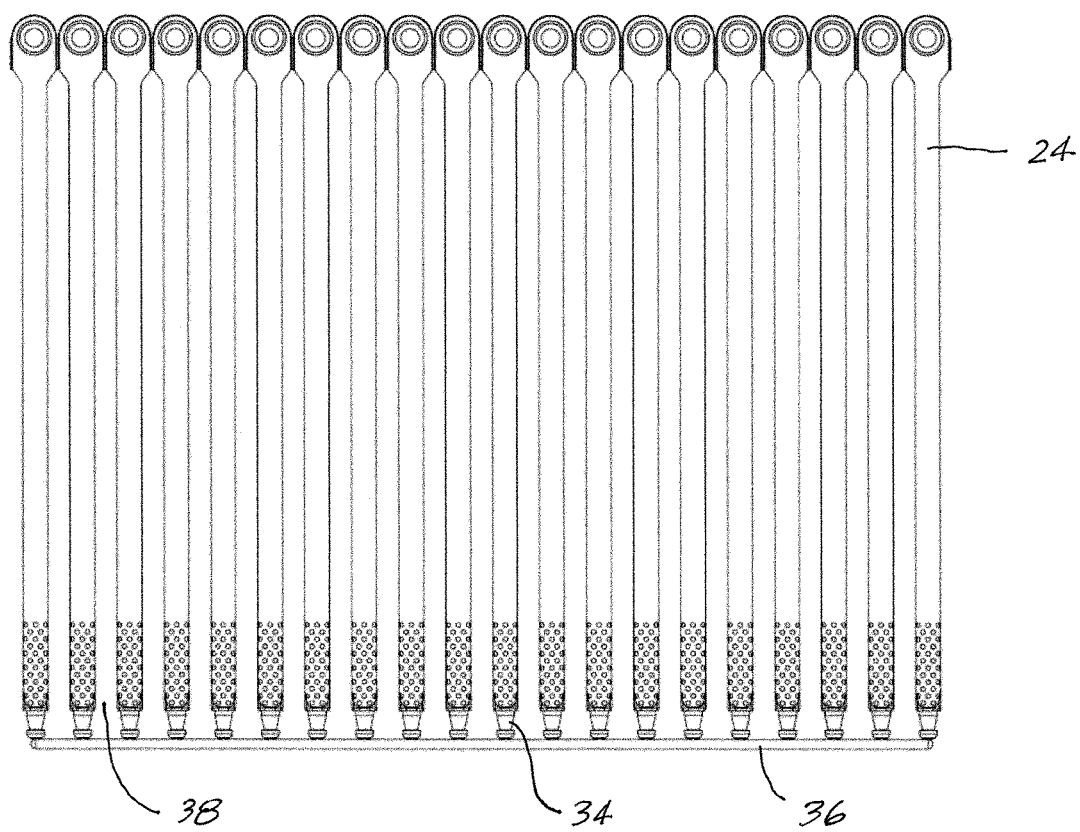
FIG. 17 is a bottom plan view of the tote box seals of FIG. 14.
Figure 18:
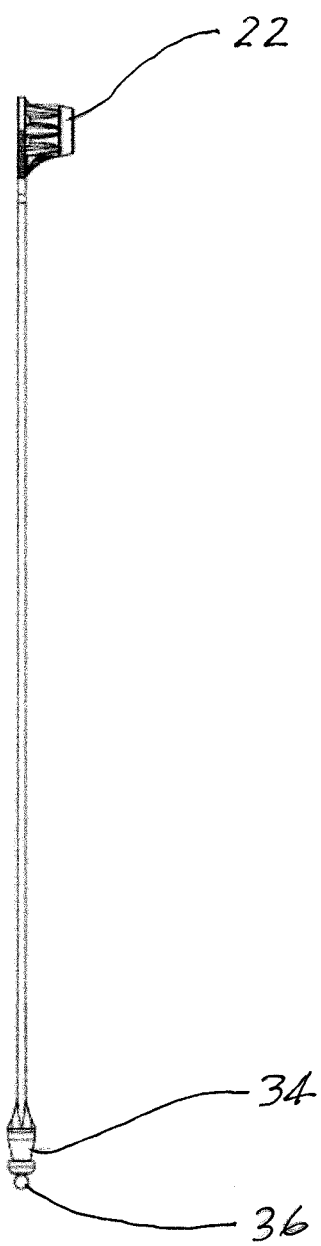
FIG. 18 is a side elevation view of the tote box seals of FIG. 14.

The location where the cutting action occurs on the mat of tote box seals 24 is best shown in FIGS. 15 and 17 and is typically identified by the reference numeral 140.

The vacuum bar 94 maintains the mat of uncut tote box seals 24 and the cut apart tote box seals 100, 102, 104, 106, 108, 110, 112, 114, 116, 118, 120, 122, 124, 126, 128, 130, 123, 134, 136, 138 in a flat condition resting on the base plate 12. After cutting and removing the runner 36 the vacuum bar 94 lifts the tote box seals 100, 102, 104, 106, 108, 110, 112, 114, 116, 118, 120, 122, 124, 126, 128, 130, 123, 134, 136, 138 while holding them flat. The transfer assembly 84 then transfers the cut apart tote box seals 100, 102, 104, 106, 108, 110, 112, 114, 116, 118, 120, 122, 124, 126, 128, 130, 123, 134, 136, 138 and places them in the container 96 while maintaining the cut apart tote box seals 100, 102, 104, 106, 108, 110, 112, 114, 116, 118, 120, 122, 124, 126, 128, 130, 123, 134, 136, 138 in a flat condition. The tote box seals 100, 102, 104, 106, 108, 110, 112, 114, 116, 118, 120, 122, 124, 126, 128, 130, 123, 134, 136, 138 are thus stacked in a neat and ordered stack in the container 96 for shipment.

Figure 8:
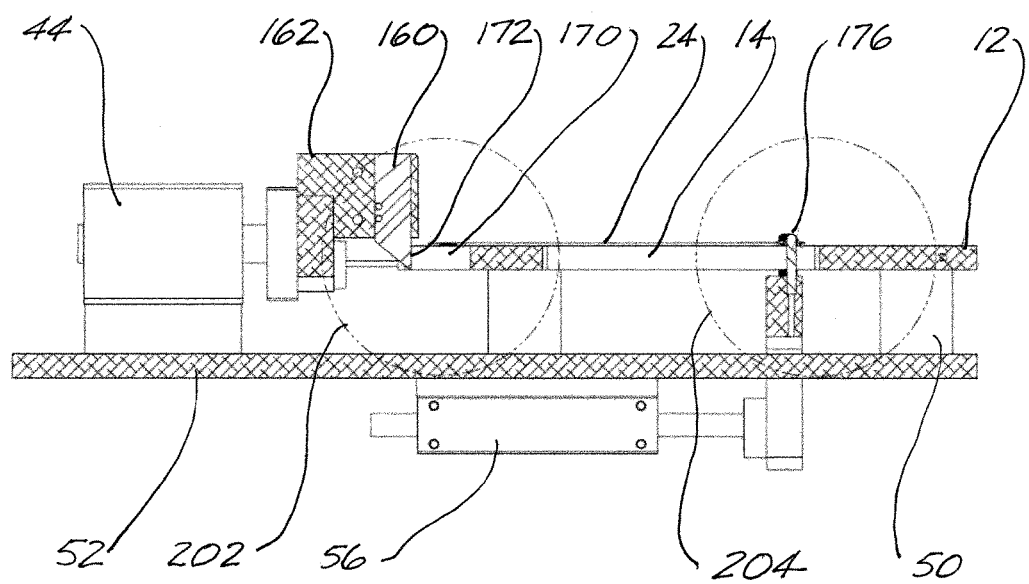
FIG. 8 is a cross-sectional view taken along the line 8-8 of FIG. 7 showing the relative positions of component parts prior to the start of the cutting process.

After the tote box seals 100, 102, 104, 106, 108, 110, 112, 114, 116, 118, 121, 122, 124, 126, 128, 130, 123, 134, 136, 138 have been placed in the container 96, the actuators 44 and 56 return the cutter assembly 18 and the pin assembly 16 to the positions shown in FIG. 8, ready for the next mat of tote box seals 24.

The details of construction of the transfer assembly 84 are well known in the art and therefore details of construction of the transfer assembly have not been illustrated in detail.

The operation of the tote box seal cutting system 10 may be best described with reference to FIGS. 8-13.

Figure 9:
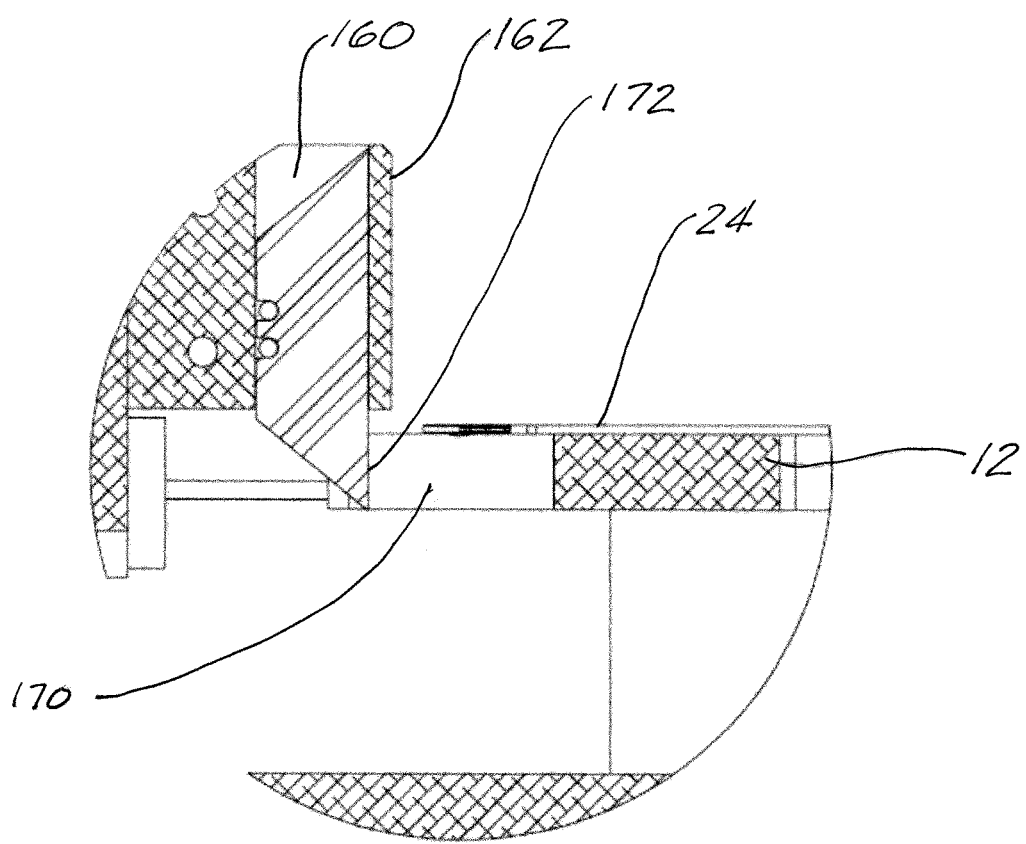
FIG. 9 is a fragmentary cross-sectional view of a portion of FIG. 8 drawn to an enlarged scale.
Figure 10:
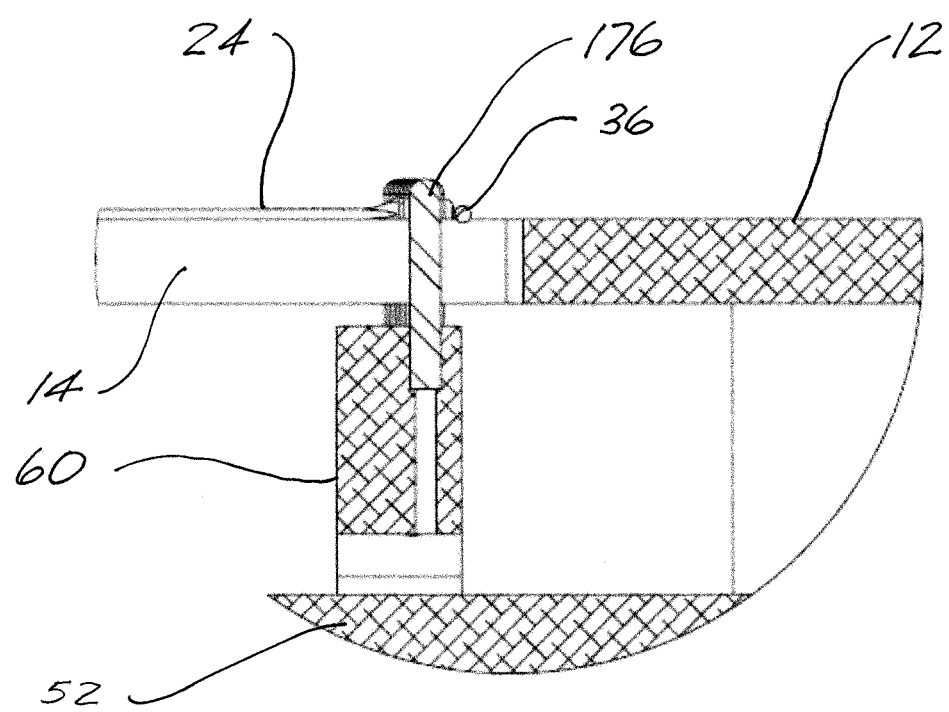
FIG. 10 is a fragmentary cross-sectional view of another portion of FIG. 8 drawn to an enlarged scale.
Figure 11:
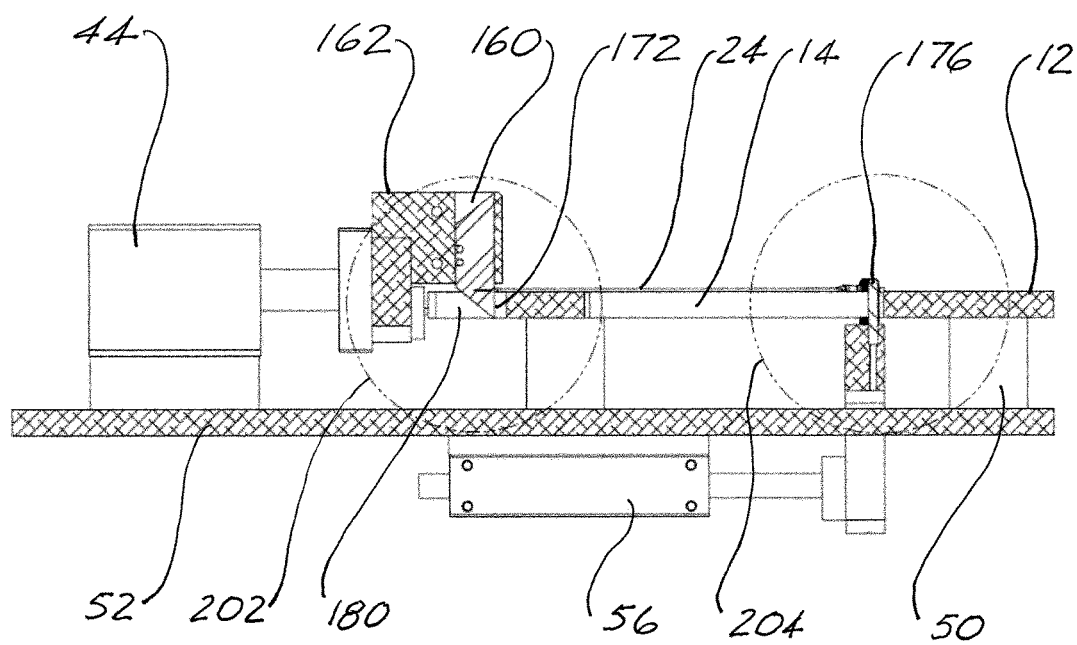
FIG. 11 is a cross-sectional view taken along line 8-8 of FIG. 7 similar to FIG. 8 showing the relative positions of components parts after completion of the cutting process.

In FIGS. 8 and 11 the broken lines 202 and 204 represent areas which have been shown drawn to an enlarged scale in FIGS. 9, 10, 12, 13.

FIGS. 8-10 show the relative positions of the various components of the apparatus according to the present invention 10 prior to the start of the cutting process.

As is shown in FIG. 8 the blade 160 is one of a plurality of blades 42. Blade 160 is clamped in a cartridge 162 which is one of a plurality of cartridges 40 by a pair of clamping screws 166, 168 in FIG. 7. As is shown best in FIGS. 8 and 9, the blade 160 rides in a slot 170 formed in the base plate 12. The slot 170 shown is one of a plurality of identical slots 180. The plurality of slots 180 is best shown in FIG. 2.

Prior to the start of the cutting process the sharpened edge 172 of the blade 42 is positioned to the left of the mat of tote box seals 24, as viewed in FIGS. 8 and 9. The blade 42 is thus clear of the mat of tote box seals 24 thereby enabling the vacuum type transfer assembly 84 to place the mat of tote box seals 24 onto the base plate 12 as is shown in FIG. 8.

As is best shown in FIG. 8, when the mat of the tote box seals 24 is placed on the base plate 12 the pin 176 which is part of a plurality of pins 58 projects into such as the space 38 which is formed between adjacent tote box seals 136, 138 in the mat 24. The configuration shown in FIG. 8 is typical and each of the plurality of pins 58 projects into a space between adjacent tote box seals 100, 102, 104, 106, 108, 110, 112, 114, 116, 118, 120, 122, 124, 126, 128, 130, 123, 134, 136, 138.

Figure 12:
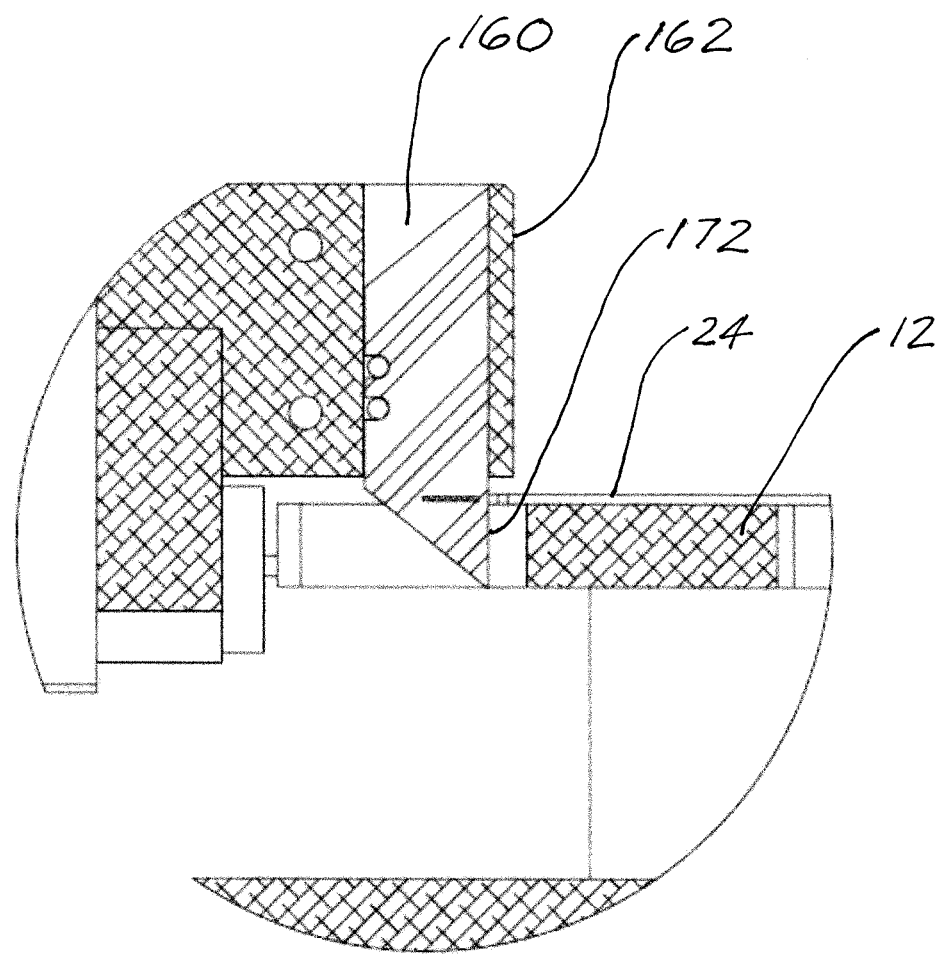
FIG. 12 is a fragmentary cross-sectional view of a portion of FIG. 11 drawn to an enlarged scale.
Figure 13:
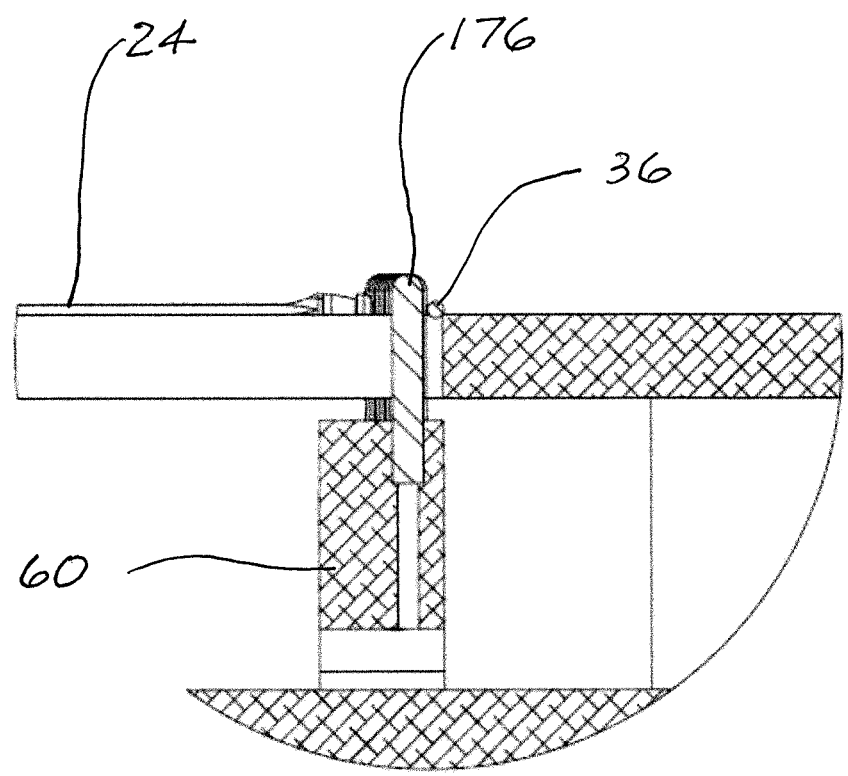
FIG. 13 is a cross-sectional view of another portion of FIG. 11 drawn to an enlarged scale.

FIGS. 11-13 show the relative positions of the various components during the cutting process.

As is shown in FIGS. 11 and 12 the actuator 44 has moved the cartridges 40 and the blades 42 to the right as indicated by the arrow 48 in FIGS. 1 and 12 causing the blades 42 to cut apart adjacent tote box seals 100, 102, 104, 106, 108, 110, 112, 114, 116, 118, 120, 122, 124, 126, 128, 130, 123, 134, 136, 138.

Simultaneously or nearly simultaneously with the cutting action described above, the actuator 56 drives the pin 176 which is one a plurality of pins 58 to the right in the direction shown by the arrow 48 in FIG. 4. This action causes the pin 176 to bear against the runner 36 which joins adjacent tote box seals 100, 102, 104, 106, 108, 110, 112, 114, 116, 118, 120, 122, 124, 126, 128, 130, 123, 134, 136, 138 as is shown in FIG. 15. This action causes the runner 36 to break away from the tote box seals.

The plurality of pins 58 which ride in the slots 14 and in the space between adjacent tote box seals 100, 102, 104, 106, 108, 110, 112, 114, 116, 118, 120, 122, 124, 126, 128, 130, 123, 134, 136, 138 apply force against the runner simultaneously, thereby preventing any twisting of the mat of the tote box seals 24 and promoting a clean break away of the runner 36.

The foregoing specific embodiment of the present invention as set forth in the specifications herein is for illustrative purposes only. Various deviations and modifications may be made within the spirit and space of this invention, without departing from a main theme thereof.

What is claimed is:

1. A tote box seal cutting station for cutting apart from one another a plurality of tote box seals after molding, each seal having a locking barrel projecting upward from said seal at a first end and at an opposite second end a runner connecting said plurality of tote box seals, the station comprising:
    a base plate;
    a cutter assembly;
    a first actuator mounted to a side of said base plate;
    driving connections connecting said first actuator and said cutter assembly;
    a plurality of cutting blades mounted on said cutter assembly;
    a pin assembly disposed below said base plate;
    a second actuator; and
    driving connections connecting said second actuator and said pin assembly, with said pin assembly comprising a plurality of pins, said base plate comprising a first plurality of slots aligned with a second plurality of slots and with said plurality of pins riding in said second plurality of slots with a portion of each of said pins projecting above said base plate and with said plurality of cutting blades riding in said first plurality of slots to divide said locking barrels from each others; and wherein said plurality of pins are arranged to cause said runner to break away from said tote box seals.

2. The tote box seal cutting station as claimed in claim 1 further comprising:
    a plurality of cavities formed in said base plate, said cavities being dimensioned to receive said upward projecting locking barrels.

3. The tote box seal as claimed in claim 1 wherein said first actuator and said second actuator each comprise:
    a pneumatic actuator.

4. The tote box seal cutting station as claimed in claim 1 wherein said cutter assembly comprises:
    a plurality of cartridges with each of said cartridges capable of mounting one of said plurality of cutting blades.

5. The tote box seal cutting station as claimed in claim 4 wherein said cutter assembly comprises:
    a plurality of cartridges with selected cartridges mounting a cutting blade.

6. The tote box seal cutting station as claimed in claim 1 further comprising:
    a timing apparatus connected to said first actuator for controlling timed operation of said second actuators.

7. The tote box seal cutting station as claimed in claim 6 wherein said timing apparatus comprises:
    a pneumatic logic timing apparatus.

8. The tote box seal cutting station as claimed in claim 1 wherein said base plate comprises:
    a planar surface and wherein said first actuator is disposed to drive said cutting blades in a direction parallel to said planar surface.

9. The tote box seal cutting station as claimed in claim 8 wherein said second actuator is disposed to drive said pins in a direction parallel to said planar surface.

10. The tote box cutting station as claimed in claim 1 wherein said base plate comprises:
   a plurality of cavity portions for accepting projecting portion of a mat of tote box seals.

11. The tote box seal cutting station as claimed in claim 1 for cutting operation on work pieces further comprising:
   a transfer assembly disposed said base plate for holding work pieces during operation.

12. The tote box seal cutting station as claimed in claim 1 wherein said first actuator is adjustably mounted on said base plate.

\* \* \* \* \*